United States Patent
Suto

(10) Patent No.: US 7,837,103 B2
(45) Date of Patent: Nov. 23, 2010

(54) METHOD AND SYSTEM FOR ACCOUNTING ITEM SOLD BY WEIGHT

(75) Inventor: Atsunori Suto, Maebashi (JP)

(73) Assignees: Fujitsu Limited, Kawasaki (JP); Fujitsu Frontech Limited, Tokyo (JP)

(*) Notice: Subject to any disclaimer, the term of this patent is extended or adjusted under 35 U.S.C. 154(b) by 940 days.

(21) Appl. No.: 11/475,088

(22) Filed: Jun. 27, 2006

(65) Prior Publication Data

US 2007/0210154 A1  Sep. 13, 2007

(30) Foreign Application Priority Data

Mar. 13, 2006  (JP)  ............................. 2006-067049

(51) Int. Cl.
- G06K 15/00  (2006.01)
- G06F 7/08  (2006.01)
- G06F 19/00  (2006.01)
- G06F 17/00  (2006.01)
- G06Q 30/00  (2006.01)
- G06Q 90/00  (2006.01)
- G06Q 20/00  (2006.01)
- G06G 7/00  (2006.01)
- G01G 19/413  (2006.01)

(52) U.S. Cl. ..................... 235/383; 235/378; 235/381; 235/385; 705/400; 705/416; 705/414; 705/23

(58) Field of Classification Search .............. 235/378, 235/381, 383, 385; 705/400, 416, 414, 23; 340/572.1

See application file for complete search history.

(56) References Cited

U.S. PATENT DOCUMENTS

| | | | | |
|---|---|---|---|---|
| 4,204,197 A | * | 5/1980 | Loshbough et al. | 341/168 |
| 4,373,133 A | * | 2/1983 | Clyne et al. | 235/383 |
| 4,375,838 A | * | 3/1983 | Yano et al. | 177/50 |
| 4,787,467 A | * | 11/1988 | Johnson | 177/50 |
| 5,811,768 A | * | 9/1998 | Choi et al. | 219/704 |
| 6,779,722 B1 | * | 8/2004 | Mason | 235/383 |
| 6,794,586 B1 | * | 9/2004 | Mason | 177/25.15 |
| 6,894,258 B2 | * | 5/2005 | Chun | 219/708 |

(Continued)

FOREIGN PATENT DOCUMENTS

EP   1419977 A2 *  5/2004

(Continued)

*Primary Examiner*—Daniel Walsh
(74) *Attorney, Agent, or Firm*—Westerman, Hattori, Daniels & Adrian, LLP

(57) ABSTRACT

A system for accounting an item sold by weight according to the present invention detects the weight of the item sold by weight taken in a package, calculates the sales price for the item sold by weight taken in the package based on the detected weight, and writes information on the detected weight and information on the calculated sales price in a recording unit provided on a tray for holding the package and from which data can be read and in which data can be written. Then, the system checks whether an unjust purchase is done for the item sold by weight before the system makes accounts square for the item sold by weight or before the system starts selling the item sold by weight by measuring the weight of the tray and checking whether the weight of the tray identified by the recorded information of the recording unit and the measured weight match or not.

6 Claims, 12 Drawing Sheets

U.S. PATENT DOCUMENTS

| | | | |
|---|---|---|---|
| 7,311,250 B1* | 12/2007 | Herwig | 235/383 |
| 7,328,170 B2* | 2/2008 | Jacobs et al. | 705/21 |
| 7,416,119 B1* | 8/2008 | Inderrieden | 235/383 |
| 2002/0103708 A1* | 8/2002 | Kloubakov et al. | 705/21 |
| 2003/0024982 A1* | 2/2003 | Bellis et al. | 235/383 |
| 2004/0113786 A1* | 6/2004 | Maloney | 340/568.1 |
| 2006/0038007 A1* | 2/2006 | Dickover et al. | 235/383 |
| 2006/0196935 A1* | 9/2006 | Muto | 235/383 |
| 2007/0210154 A1* | 9/2007 | Suto | 235/383 |
| 2007/0254080 A1* | 11/2007 | Schackmuth et al. | 426/523 |
| 2008/0120193 A1* | 5/2008 | Schuller et al. | 705/23 |
| 2008/0257612 A1* | 10/2008 | Raymond et al. | 177/253 |
| 2009/0293423 A1* | 12/2009 | Schuller et al. | 53/131.2 |

FOREIGN PATENT DOCUMENTS

| | | |
|---|---|---|
| JP | 2000-259947 (A) | 9/2000 |
| JP | 2004-21412 (A) | 1/2004 |

\* cited by examiner

FIG. 4

| TRAY NUMBER | 0110 | | | | | |
|---|---|---|---|---|---|---|
| TRAY TABLE NUMBER | FOOD NUMBER | FOOD NAME | UNIT PRICE (YEN) | QUANTITY (g) | NUMBER OF PIECES | AMOUNT (YEN) |
| | | | | | | |

FIG. 5

| WEIGHT OF TRAY (g) | 200 | |
|---|---|---|
| TRAY TABLE NUMBER | TOTAL WEIGHT BEFORE FOOD IS SOLD (g) | TOTAL WEIGHT AFTER FOOD IS SOLD (g) |
| | | |

FIG. 6

| FOOD NUMBER | FOOD NAME | UNIT PRICE (YEN/10g) | UNIT PRICE (YEN/ONE PIECE) | WEIGHT/ THRESHOLD (g) | EXPIRATION DATE INFORMATION |
|---|---|---|---|---|---|
| 001 | FOOD BOILD IN SOY SAUCE | 30 | — | — | NONE |
| 002 | BURDOCK AND CARROT COOKED WITH SOY SOURCE | 50 | — | — | ONE MONTH |
| 003 | SWEET POTATO PASTE MIXED WITH CHESTNUTS | 30 | — | — | TWELVE DAYS |
| 004 | FRIED HORSE MACKEREL | — | 100 | 100, +/−15 | TWELVE HOURS |
| 005 | MINCE CUTLET | — | 60 | 70, +/−10 | TWENTY FOUR HOURS |
| ...... | ...... | ...... | ...... | ...... | ...... |

FIG. 7

| TRAY NUMBER | 0110 | | | | | |
|---|---|---|---|---|---|---|
| TRAY TABLE NUMBER | FOOD NUMBER | FOOD NAME | UNIT PRICE (YEN) | QUANTITY (g) | NUMBER OF PIECES | AMOUNT (YEN) |
| 3 | 001 | FOOD BOILD IN SOY SAUCE | 30 | 50 | 0 | 150 |
| 5 | 003 | SWEET POTATO PASTE MIXED WITH CHESTNUTS | 30 | 100 | 0 | 300 |
| 8 | 004 | FRIED HORSE MACKEREL | 100 | 0 | 2 | 200 |

FIG. 8

| WEIGHT OF TRAY (g) | 200 | |
|---|---|---|
| TRAY TABLE NUMBER | TOTAL WEIGHT BEFORE FOOD IS SOLD (g) | TOTAL WEIGHT AFTER FOOD IS SOLD (g) |
| 3 | 0 | 50 |
| 5 | 50 | 150 |
| 8 | 150 | 355 |

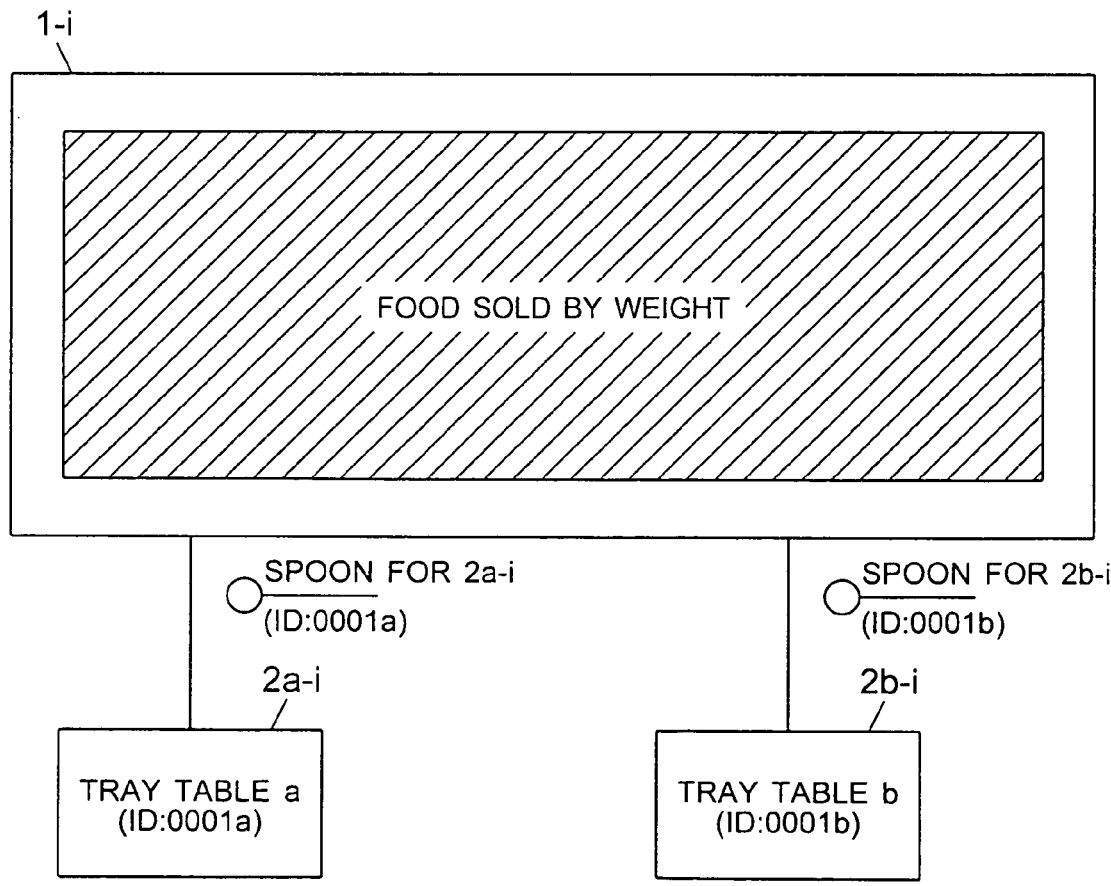

METHOD AND SYSTEM FOR ACCOUNTING ITEM SOLD BY WEIGHT

CROSS-REFERENCE TO RELATED APPLICATIONS

This application claims the conventional priority based on Japanese Application No. 2006-067049, filed on Mar. 13, 2006, the disclosures of which are incorporated herein by reference.

BACKGROUND OF THE INVENTION

1. Field of the Invention

The present invention generally relates to a method for accounting an item sold by weight executed in a system which accounts an item sold by weight taken out from a selling space into a package by a purchaser or a shop assistant and a system for accounting an item sold by weight that executes the method for accounting an item sold by weight.

2. Description of the Related Art

When a supermarket or the like sells foods, it may sell a food piece by piece or may sell a food in purchaser's desired quantity such as selling a prepared food by weight.

When a shop sells foods piece by piece, the accounting of the foods is relatively simple. As the shop fixes a unit price for a food and only needs to count the number of the food to sell in order to sell the food piece by piece, it can make accounts square for the food in a relatively simple manner.

When a purchaser buys an item such as a food at a supermarket or the like, the purchaser may buy many kinds of items at a time. In such a case, even if the supermarket sells an item piece by piece, it takes long to make accounts square for such many kinds of items.

In view of such circumstances, an invention is disclosed that can make accounts square for the item in a short time when many kinds of items are purchased at a time by attaching an electronic tag that records a sales price on each of the items and providing a shopping cart for carrying items with a client apparatus with a function of obtaining a sales price for each of the items taken in the shopping cart by reading the electronic tag on each of the items and summing up and displaying the total (for example, see Japanese Patent Laid-Open No. 2000-259947).

Another invention is disclosed that can automatically make accounts square for the items when a user selects items and carries them on a tray to the accounting place for paying for the items on the tray, by attaching an IC tag on the tray and writing price information on the items in the IC tag each time the user takes items from a showcase (for example, see Japanese Patent Laid-Open No. 2004-021412).

The invention described in the Japanese Patent Laid-Open No. 2004-021412 is adapted to provide a weight sensor at a place for receiving items where a user places a tray, calculate price information according to an increase of the weight measured by the weight sensor and write the price information in the IC tag when the items are sold by weight.

If a shop sells foods by weight such as to sell prepared foods by weight, it is quite troublesome for the shop to make accounts square.

That is to say, when a shop sells foods by weight, it lets a purchaser take a desired quantity of the foods into a package, measures the quantity of the foods at the cash register, and makes accounts square for the foods. Therefore, it is quite troublesome for the shop to make accounts square.

When a shop sells foods by weight, a purchaser can put only a kind of foods sold by weight in a package as a sales price differs for each kind. When a purchaser wants to buy many kinds of foods sold by weight, the purchaser has to do that process for the number of the kinds of foods bought by the purchaser. Therefore, it is quite troublesome for a purchaser to get the foods made accounts square.

As mentioned above, when a shop sells foods by weight, it lets a purchaser take a desired quantity of the foods in a package, measures the quantity of the foods at the cash register, and makes accounts square for the foods. Therefore, it is quite troublesome for the shop to make accounts square.

When a shop sells foods by weight, a purchaser can put only a kind of foods sold by weight in a package as a sales price differs for each kind. When a purchaser wants to buy many kinds of foods sold by weight, the purchaser has to do that process for the number of the kinds of foods bought by the purchaser. Therefore, it is quite troublesome for a purchaser to get the foods made accounts square.

When a shop sells foods by weight, a purchaser can put only a kind of foods sold by weight in a package as a sales price differs for each kind. That causes a problem of consuming many package recourses.

The invention described in the Japanese Patent Laid-Open No. 2004-021412 is adapted to provide a weight sensor at a place for receiving items where a user places a tray, calculate price information based on an increase of the weight measured by the weight sensor and write the price information in the IC tag when the items selected by a user are sold by weight.

It is assumed that the invention described in the Japanese Patent Laid-Open No. 2004-021412 is applied to a sales method for a cafeteria system restaurant and not to a general sales method for a supermarket or the like. The invention does not consider a possibility that a purchaser may perform an unjust purchase when it sells foods by weight. The invention is only adapted to calculate price information based on the weight of the selected items sold by weight and write the price information in the IC tag when the items selected by a purchaser are sold by weight.

Therefore, even the invention described in the Japanese Patent Laid-Open No. 2004-021412 cannot realize a practical automatic accounting system for the items sold by weight at a general shop such as a supermarket (the items such as foods sold by weight).

SUMMARY OF THE INVENTION

The present invention is adapted in view of such circumstances and it is an object of the present invention to provide a method for accounting items sold by weight that realizes a practical automatic accounting system for items sold by weight at a general shop such as a supermarket.

It is another object of the present invention to provide a system for accounting items sold by weight that realizes a practical automatic accounting system for items sold by weight at a general shop such as a supermarket.

It is still another object of the present invention to provide an apparatus for performing sales assisting of item sold by weight that realizes a practical automatic accounting system for items sold by weight at a general shop such as a supermarket.

The method for accounting an item sold by weight of the present invention is the method for accounting an item sold by weight executed in a system for accounting an item sold by weight taken in a package. The method comprises detecting a weight of an item sold by weight taken in the package, calculating a sales price of the item sold by weight taken in the package based on the detected weight, writing information on the detected weight and information on the calculated sales price in a recording unit provided for the package or a tray for holding the package and from which data can be read and in which data can be written, checking whether an unjust purchase is done for the item sold by weight or not according to the weight information written in the recording unit, and accounting the item sold by weight according to the sales price information written in the recording unit.

The system for accounting an item sold by weight of the present invention is the system for accounting an item sold by weight for accounting an item sold by weight taken in a package. The system comprises. a detecting unit detecting a weight of an item sold by weight taken in the package, a calculating unit calculating a sales price of the item sold by weight taken in the package based on the weight detected by the detecting unit, a writing unit writing information on the weight detected by the detecting unit and information on the sales price calculated by the calculating unit in a recording unit provided for the package or a tray for holding the package and from which data can be read and in which data can be written, a check unit checking whether an unjust purchase is done for the item sold by weight or not according to the weight information written in the recording unit, and an accounting unit accounting the item sold by weight according to the sales price information written in the recording unit.

The apparatus for assisting sales of item sold by weight of the present invention is the apparatus for performing sales assisting of item sold by weight provided at a selling space and writing information on the item sold by weight sold at the selling space in a recording unit provided on a package in which an item sold by weight is taken or a tray holding the package and from which data can be read and in which data can be written. The apparatus comprises a detecting unit detecting a weight of an item sold by weight taken in the package at the selling space by detecting a change in the weight of the item sold by weight placed on the selling space to which the apparatus is set, a calculating unit calculating a sales price of the item sold by weight taken in the package based on the weight detected by the detecting unit, and a writing unit writing information on the weight detected by the detecting unit and information on the sales price calculated by the calculating unit in the recording unit.

According to the present invention, items sold by weight can be accounted without requiring each kind of the items to be weighed at an accounting place, while checking whether an unjust purchase is done for the items sold by weight or not.

Accordingly, the present invention can effectively make accounts square for the items sold by weight and also reduce usage of the package resource, as it enables a plurality of items sold by weight to be taken into a package.

In this manner, according to the present invention, a practically automatic accounting system for items sold by weight at a general shop such as a supermarket can be realized.

BRIEF DESCRIPTION OF THE DRAWINGS

FIGS. 4 and 5 are tables showing a data format written in an electronic tag.

FIG. 6 is a table showing information managed in a foods information table.

FIGS. 7 and 8 are tables showing an example of data written in the electronic tag.

FIG. 12 is a diagram showing an example of information presented to a purchaser.

FIGS. 13 and 14 are diagrams of an embodiment of setting a food table and a tray table.

DETAILED DESCRIPTION OF THE PREFERRED EMBODIMENTS

Figure 1:
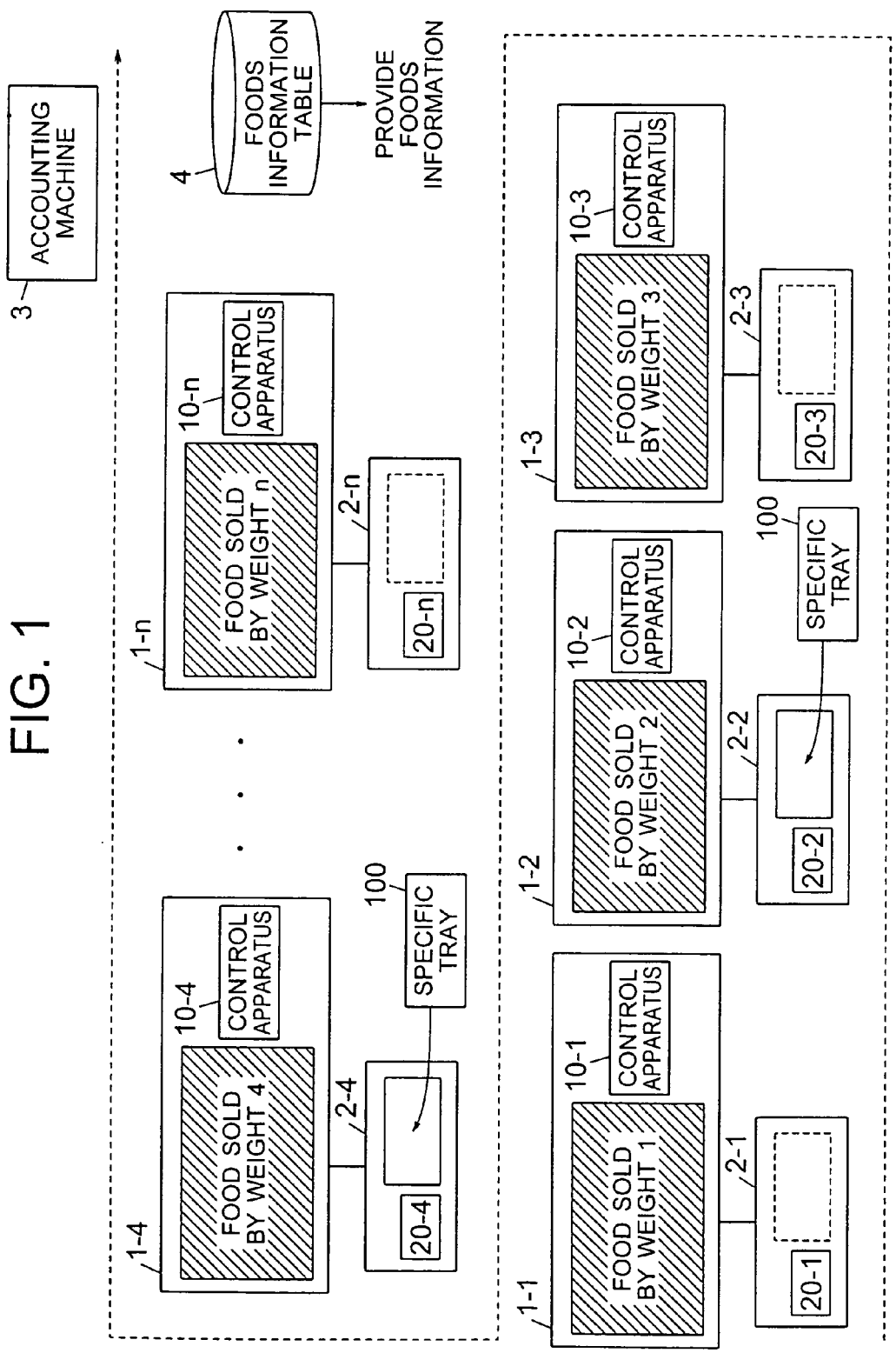
FIG. 1 is a diagram showing a structure of a system for accounting a food sold by weight according to the present invention.

Hereinafter the outline of the system for accounting an item sold by weight of the present invention is described. The system for accounting an item sold by weight of the present invention accounts for the item sold by weight taken out from a selling space into a package. The system includes (1) a detecting unit provided at each selling space and detecting a weight of an item sold by weight taken in a package at the selling space, (2) calculating unit provided at each selling space and calculating a sales price of the item sold by weight taken in the package at the selling space based on the weight detected by the detecting unit, (3) a writing unit provided at each selling space and writing information on the weight detected by the detecting unit and information on the sales price calculated by the calculating unit in a recording unit provided for the package or a tray for holding the package and from which data can be read and in which data can be written, (4) a check unit provided at each selling space and an accounting place and checking whether an unjust purchase is done for the item sold by weight or not according to the weight information written in the recording unit, (5) an accounting unit provided at an accounting place and accounting the item sold by weight according to the sales price information written in the recording unit, and (6) a weighing unit provided at each selling space and an accounting place and accepting the package or the tray for holding the package and weighing the weight of the package or the tray.

Preferably, the system further includes a second check unit provided at each selling space and checking whether an unjust purchase is done for the item sold by weight or not without using weight information written in the recording unit.

In the system for accounting items sold by weight of the present invention with such a configuration described above, the detecting unit detects a weight of an item sold by weight taken in a package at the selling space by detecting a change in the weight of the item sold by weight placed on the selling space, the calculating unit calculates a sales price of the item sold by weight taken in the package based on the weight detected by the detecting unit, and the writing unit writes information on the weight detected by the detecting unit and information on the sales price calculated by the calculating unit in the recording unit provided for the package or a tray for holding the package and from which data can be read and in which data can be written.

Preferably, the writing unit further writes the information on the detected weight in a manner of adding the detected weight to the information on the weight that has been detected at the selling space.

When a sales price of items sold by weight is set for a piece, the calculating unit calculates the number of items sold by weight taken in the package based on an average weight of one of the items sold by weight and the weight detected by the detecting unit, and calculates a sales price of the items sold by weight based on the number of the items sold by weight.

In this manner, information on weight of an item sold by weight detected at each selling space and sales price information of an item sold by weight calculated at each selling space is recorded in the recording unit provided for the package or the tray for holding the package.

Therefore, in the system for accounting an item sold by weight of the present invention, the check unit checks whether an unjust purchase is done for an item sold by weight or not before accounting is done for the item by weighing a weight of a tray for holding a package (a weight of a package when a tray is not used) by using the weighing unit before accounting is done for the item sold by weight in the package, calculating a sum of the weight of the item sold by weight written in the recording unit and the weight of the tray (weight of a package when a tray is not used) written in the recording unit, and checking whether the calculated sum and the weighed weight match or not.

The check unit also checks whether an unjust purchase is done for the item sold by weight or not before the item sold by weight is sold by weighing a weight of a tray for holding a package (a weight of a package when a tray is not used) by using the weighing unit before the item sold by weight is taken into the package at each selling space, calculating a sum of the weight of the item sold by weight written in the recording unit and the weight of the tray (weight of a package when a tray is not used) written in the recording unit, and checking whether the calculated sum and the weighed weight match or not.

Preferably, the second check unit further checks whether an unjust purchase is done for an item sold by weight or not when the item sold by weight is sold by weighing a weight of a tray for holding a package (a weight of a package when a tray is not used) by using the weighing unit before and after the item sold by weight is taken into the package at each selling space, measuring the weight of the item sold by weight taken in the package by measuring an increase of the weight, and checking whether the weight of the item sold by weight detected by using the detecting unit placed at the selling space and the measured weight match or not.

Then, in the system for accounting an item sold by weight of the present invention, the accounting unit makes accounts square for the items sold by weight according to the sales price information that has been written in the recording unit at each selling space when the system makes accounts square for the items sold by weight taken in the package at the accounting place.

The present invention will be described in detail according to an embodiment applied to a system for accounting a food sold by weight.

FIG. 1 shows an example of a structure of a system for accounting a food sold by weight according to the present invention.

As shown in FIG. 1, the system for accounting a food sold by weight according to the present invention has a plurality of food tables 1-$i$ ($i$=1–n) on which foods sold by weight are placed, a tray table 2-$i$ ($i$=1–n) that is provided in association with the food tables 1-$i$ and prepared as a table on which a specific tray 100 with a configuration to be described below is placed, an accounting machine 3 including a POS system for accounting the foods sold by weight taken in a package placed on the specific tray 100, and a foods information table 4 for managing price information on the foods sold by weight and providing the information for the food tables 1-$i$ or the accounting machine 3.

Each of the food table 1-$i$ has a control apparatus 10-$i$ ($i$=1–n) for controlling the sale of foods sold by weight. Each of the food table 1-$i$ includes a scale and has a function of detecting a weight of a food sold by weight placed on the food table 1-$i$.

The tray table 2-$i$ has a tray side control apparatus 20-$i$ ($i$=1–n) for executing process requested by the control apparatus 10-$i$. The tray table 2-$i$ includes a scale and has a function of detecting a weight of the specific tray 100 placed on the tray table 2-$i$.

Each of the food table 1-$i$ and the tray table 2-$i$ is connected via a cable which is represented by a symbol C shown in FIG. 2 described later. The control apparatus 10-$i$ provided for each of the food tables 1-$i$ can obtain information on the weight detected by the tray table 2-$i$ by exchanging information with the tray side control apparatus 20-$i$.

Figure 2:
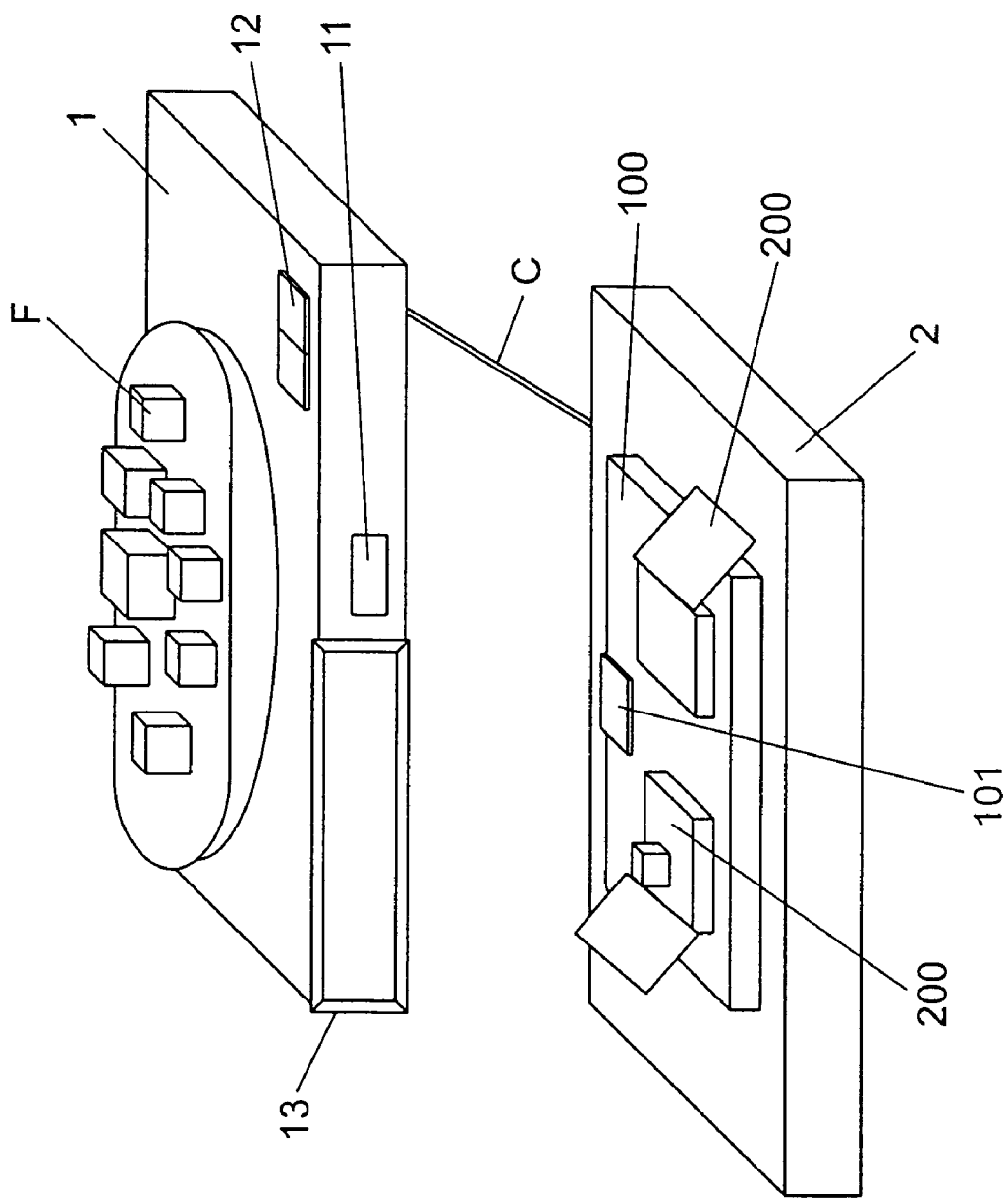
FIG. 2 is a diagram showing a structure of a food table and a tray table.
Figure 3:
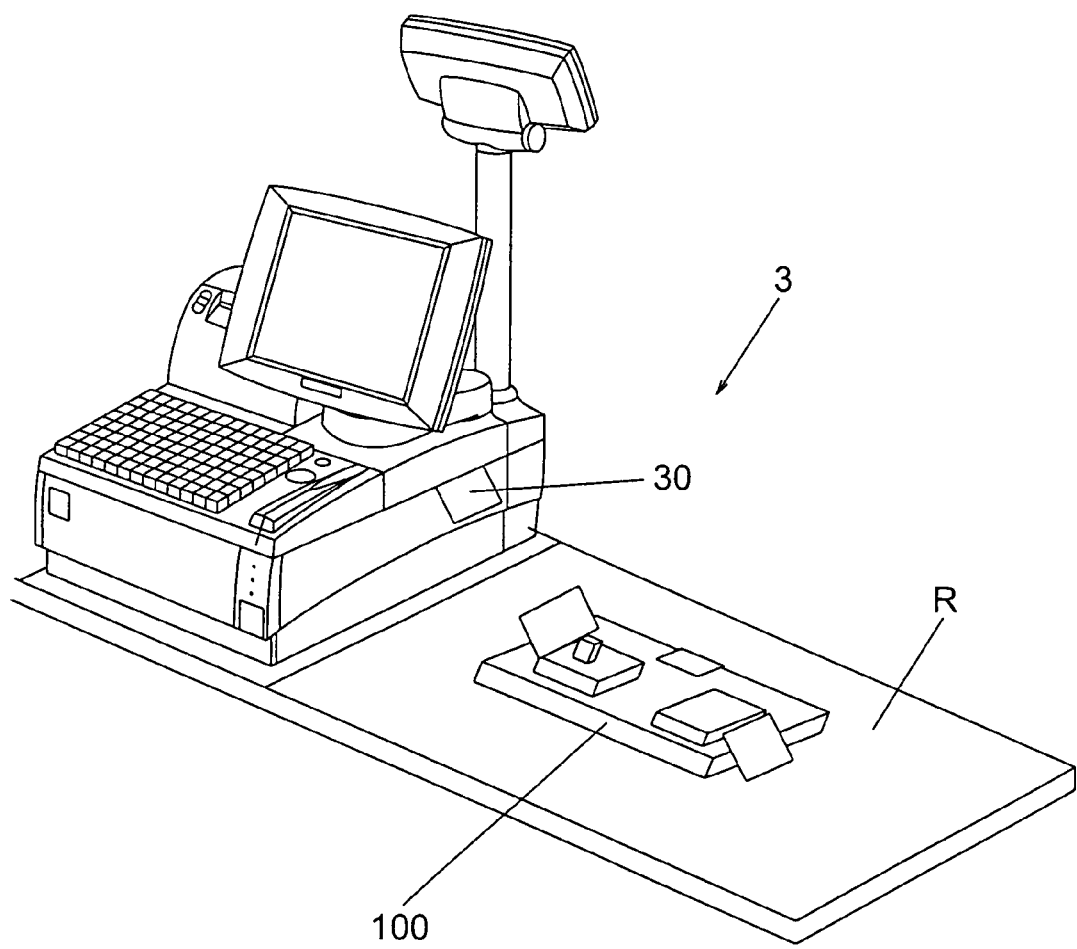
FIG. 3 is a diagram showing a structure of an accounting machine.

FIG. 2 shows a detailed structure of one of the food table 1-$i$ and the tray table 2-$i$. FIG. 3 shows a detailed structure of the accounting machine 3.

As shown in FIG. 2, an electronic tag 101 from which data can be read and in which data can be written wirelessly is attached to the specific tray 100 placed on the tray table 2-$i$. One or more packages 200 for containing foods sold by weight are placed on the specific tray 100.

Also as shown in FIG. 2, a food, such as a prepared food, sold by weight represented by a symbol F is placed on the food table 1-$i$. The food table 1-$i$ has an electronic tag reader/writer 11 for reading and writing the electronic tag 101 attached to the specific tray 100 placed on the tray table 2-$i$ which makes a pair with the food table 1-$i$. The food table 1-$i$ also has a lamp 12 for indicating its operating state and a monitor 13 for displaying a message to a purchaser of the food sold by weight.

As shown in FIG. 3, the accounting machine 3 has an electronic tag reader/writer 30 for reading and writing the electronic tag 101 attached to the specific tray 100. The accounting machine 3 includes a scale and has a function of detecting a weight of the specific tray 100 placed on a table of the accounting machine 3. A symbol R represents a register table in FIG. 3.

FIGS. 4 and 5 show examples of a data format to be written in the electronic tag 101 attached to the specific tray 100.

As shown in FIG. 4, information on the tray number indicating the specific tray 100 to which the electronic tag 101 is attached is previously written in the electronic tag 101. A writing area for writing information including the number of the tray table 2-$i$, food number, food name, unit price, quantity, the number of pieces and amount of money is reserved in the electronic tag 101.

As shown in FIG. 5, information on the weight of the specific tray 100 to which the electronic tag 101 is attached is previously written in the electronic tag 101. A writing area for writing information including the number of the tray table 2-$i$ and the total weights before and after the food is sold by weight is reserved in the electronic tag 101.

FIG. 6 shows an example of information managed in the foods information table 4.

As shown in FIG. 6, the foods information table 4 manages food names of the foods sold by weight, information on the unit prices of the foods sold by weight, and information on expiration dates of the foods sold by weight in association with the food numbers of the foods sold by weight. When a food sold by weight is sold for a unit price for a piece, the foods information table 4 manages an average weight of a piece of the food and information on a threshold indicating a range for the weight of the piece deviated from that average weight.

When a purchaser buys foods sold by weight in the system for accounting a food sold by weight according to the present invention as such, the purchaser carries the specific tray 100 with one or more packages 200 to contain the foods sold by weight placed on it. The purchaser repeats the process of placing the specific tray 100 on the tray table 2-*i* and taking a desired quantity of the food sold by weight from the food table 1-*i* into a package 200. Finally, the purchaser brings the specific tray 100 to the accounting machine 3 to pay for the foods sold by weight in the package 200. For example, in FIG. 1, the arrow with a dotted line shows a movement of the purchaser.

As the foods sold by weight are purchased in such a manner, that 50 g of a food boiled in soy sauce which is worth 150 yen (sold 30 yen per 10 g) is taken from the number three tray table 2-*i* provided in association with the food table 1-*i* for the food boiled in soy sauce of the food number 001 at first, then, 100 g of sweet potato paste mixed with chestnuts which is worth 300 yen (sold 30 yen per 10 g) is taken from the number five tray table 2-*i* provided in association with the food table 1-*i* for the sweet potato paste mixed with chestnuts of the food number 003, and then two fried horse mackerels which are worth 200 yen (sold for 100 yen per piece) are taken from the number eight tray table 2-*i* provided in association with the food table 1-*i* for the fried horse mackerels of the food number 004, as shown in FIG. 7, for example, is recorded on the writing area of the electronic tag 101 shown in FIG. 4 according to the process of the control apparatus 10-*i* to be described later.

That total 50 g of a food sold by weight is in the package 200 after the food is taken when 50 g of the food sold by weight is taken into the package 200, which was empty before the food is taken at the number three tray table 2-*i* at first, then, the total 150 g of foods sold by weight is in the package 200 after the food is taken when 100 g of a food sold by weight is taken into the package 200 containing 50 g of food sold by weight before the food is taken from the number five tray table 2-*i*, and then, the total 355 g of foods sold by weight is in the package 200 after the food is taken when two fried horse mackerels weighing 205 g are taken into the package 200 containing 150 g of foods sold by weight before the food is taken from the number eight tray table 2-*i*, as shown in FIG. 8, for example, is recorded on the writing area of the electronic tag 101 shown in FIG. 5.

Figure 9:
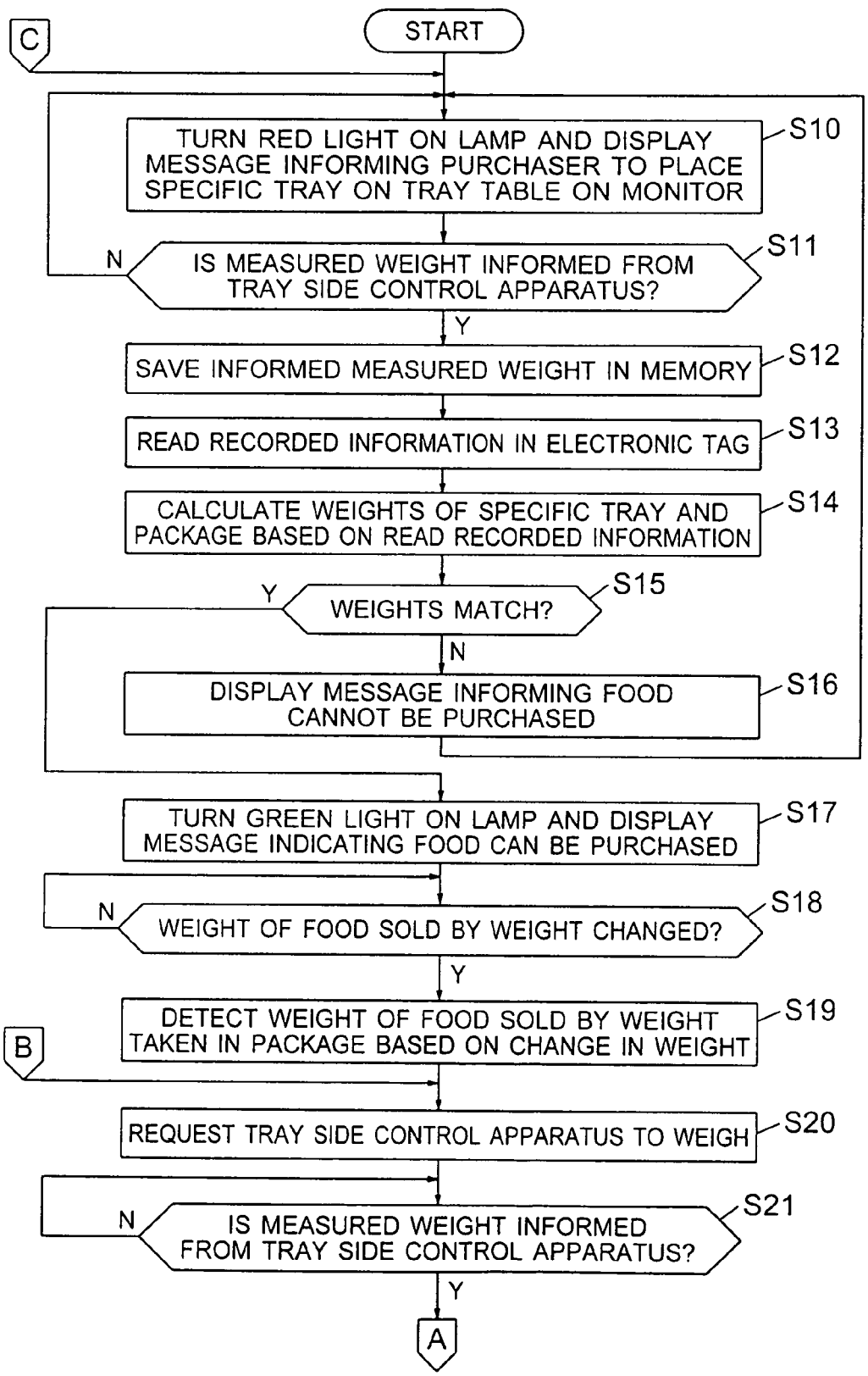
FIGS. 9 and 10 are flowcharts of process executed by a control apparatus.
Figure 10:
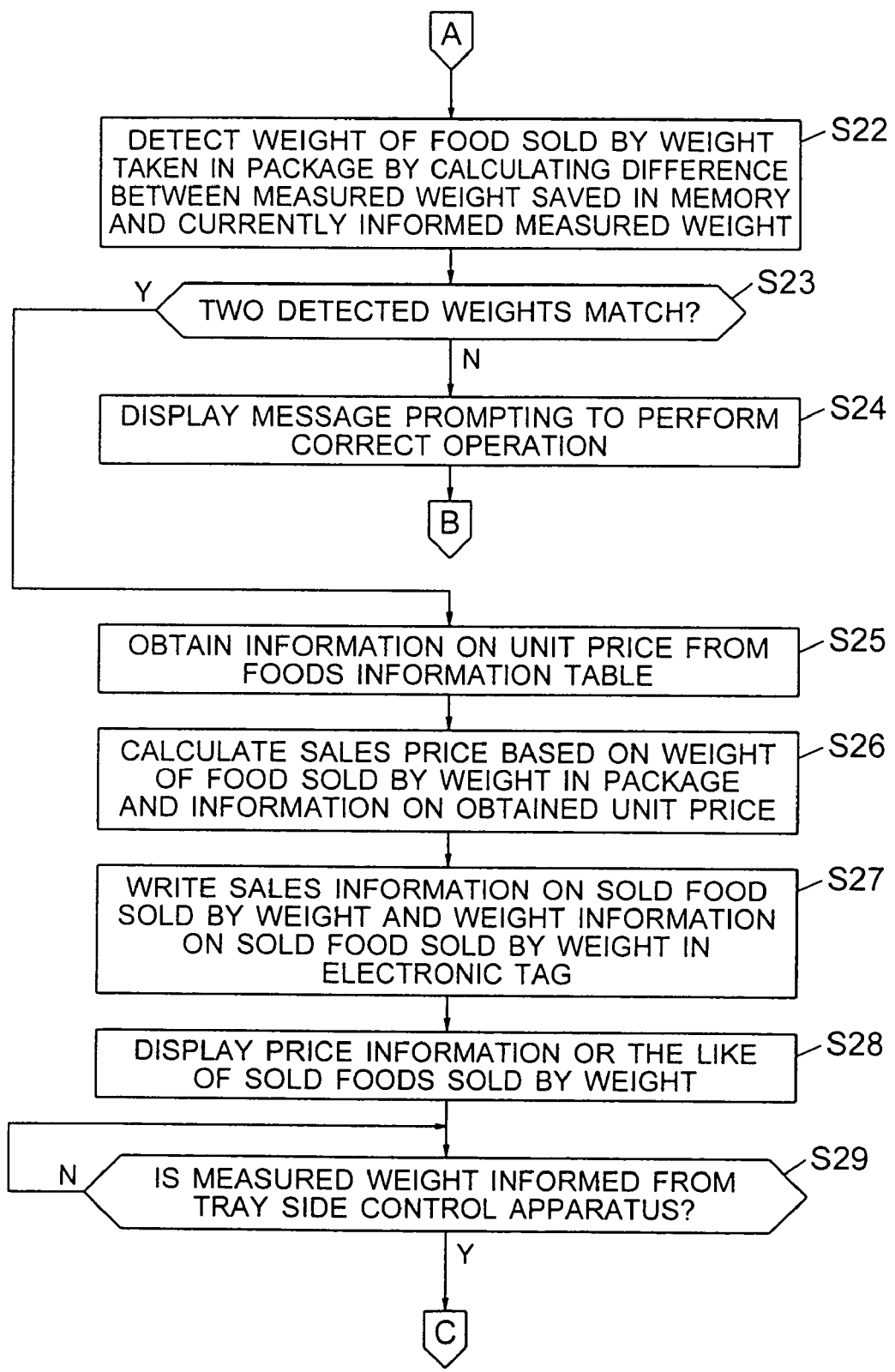

FIGS. 9 and 10 show examples of a processing flow executed by the control apparatus 10-*i* to enable automatic account of the taken foods sold by weight when the foods sold by weight are purchased in the manner described above.

Next, processing executed by the control apparatus 10-*i* will be described in detail according to flowcharts shown in FIGS. 9 and 10.

When the control apparatus 10-*i* starts at the sales starting time, it first turns a red light on the lamp 12 and displays a message informing a purchaser to place the specific tray 100 on the tray table 2-*i* when the purchaser wants to purchase the foods sold by weight placed on the food table 1-*i* on the monitor 13 at a step S10.

As seeing the display of the message, the purchaser places the specific tray 100 with a package 200 thereon on the tray table 2-*i* when the purchaser wants to purchase the food sold by weight. In response to that purchaser's operation, the tray side control apparatus 20-*i* obtains information on the weight of the specific tray 100 measured by the scale inside the tray table 2-*i* and informs the information to the control apparatus 10-*i*.

The control apparatus 10-*i* determines whether a measured weight is informed from the tray side control apparatus 20-*i* or not at a step S11. When the control apparatus 10-*i* determines that the measured weight is not informed, the control apparatus 10-*i* returns operation to the processing of the step S10 and waits until the measured weight is informed.

When the control apparatus 10-*i* determines that the measured weight is informed from the tray side control apparatus 20-*i* at the step S11, the process proceeds to a step S12 and the informed measured weight is saved in the memory.

Then at a step S13, the control apparatus 10-*i* reads recorded information in the electronic tag 101 attached to the specific tray 100 placed on the tray table 2-*i* by instructing the electronic tag reader/writer 11 to read as such, thereby extracting necessary information from the recorded information.

More specifically, information on the weight of the specific tray 100 recorded in the electronic tag 101 and information on the total weight recorded last in the information on the total weight after foods are taken recorded in the electronic tag 101 are extracted from recorded information of the read electronic tag 101.

For example, when the selling space of the foods sold by weight is the first selling space in the example shown in FIG. 8, there are extracted the tray weight of 200 g and the total weight of 0 g as no information on the total weight after foods are taken is not written yet. When the selling space of the foods sold by weight is the second selling space in the example shown in FIG. 8, there are extracted the tray weight of 200 g and the total weight of 50 g after a food is taken as only information on the total weight after a food is taken at the first selling space is written.

When the recorded information from the electronic tag 101 in the operation cannot be read at the step S13, the control apparatus 10-*i* gives an alarm to a shop assistant, for example.

Then at a step S14, the control apparatus 10-*i* calculates weights of the specific tray 100 holding the package 200 to be identified by the recorded information of the electronic tag 101 by calculating a sum of the weight of the specific tray 100 extracted at the step S13 and the total weight of the foods sold by weight extracted at the step S13.

Then at the step S15, the control apparatus 10-*i* determines whether the weight saved in the memory at the step S12 (the weight informed from the tray side control apparatus 20-*i*) and the weight calculated at the step S14 match or not.

When the control apparatus 10-*i* determines that the weight informed from the tray side control apparatus 20-*i* and the weight identified by the recorded information from the electronic tag 101 do not match according to the determination at the step S15, the process proceeds to a step S16 and the control apparatus 10-*i* displays a message informing the purchaser that it cannot process the purchase of the foods sold by weight placed on the food table 1-*i* on the monitor 13, and then returns operation to the step S10.

When the control apparatus 10-*i* determines that the weight informed from the tray side control apparatus 20-*i* and the weight identified by the recorded information of the electronic tag 101 do not match, something unjust, such as taking the package 200 from the specific tray 100, may have been done. As a result a message is displayed indicating that it cannot process the purchase of the foods sold by weight.

When the control apparatus 10-*i* determines that the weight informed from the tray side control apparatus 20-*i* and the weight identified by the recorded information from the electronic tag 101 match according to the determination at the step S15, the process proceeds to a step S17 and the control apparatus 10-*i* turns a green light on the lamp 12 and displays a message indicating that it can process the purchase of the foods sold by weight placed on the food table 1-*i* on the monitor 13.

In response to the message, the purchaser takes a desired quantity of the food sold by weight from the food table 1-*i* into the package 200.

Then at a step S18, the control apparatus 10-*i* monitors the measurement on the scale included in the food table 1-*i* to determine whether the weight of the food sold by weight placed on the food table 1-*i* has changed or not. When the control apparatus 10-*i* determines that the weight of the food sold by weight has not changed, it waits until the weight changes.

When the control apparatus 10-*i* determines that the weight of the food sold by weight placed on the food table 1-*i* has changed according to the determination at the step S18, the process proceeds to a step S19 and the control apparatus 10-*i* detects the weight of the food sold by weight taken in the package 200 based on the change in the weight.

Then at a step S20, the control apparatus 10-*i* requests the tray side control apparatus 20-*i* to weigh the specific tray 100.

In response to the request for weighing the specific tray, the tray side control apparatus 20-*i* obtains information on the weight of the specific tray 100 measured by the scale included in the tray table 2-*i* and informs the control apparatus 10-*i* of the information.

Then at the step S21, the control apparatus 10-*i* determines whether the measured weight is informed from the tray side control apparatus 20-*i* or not. When the control apparatus 10-*i* determines that the measured weight has not been informed, it waits until the measured weight is informed.

When the control apparatus 10-*i* determines that the measured weight has been informed from the tray side control apparatus 20-*i* at the step S21, the process proceeds to a step S22 and the control apparatus 10-*i* detects the weight of the food sold by weight taken in the package 200 by calculating a difference between the measured weight saved in the memory at the step S21 and the currently informed measured weight.

Then at a step S23, the control apparatus 10-*i* determines whether the weight of the food sold by weight detected at the step S19 (the weight measured by the scale included in the food table 1-*i*) and the weight of the food sold by weight detected at the step S22 (the weight measured by the scale included in the tray table 2-*i*) match or not.

When the control apparatus 10-*i* determines that two detected weights of the food sold by weight do not match according to the determination at the step S23, the process proceeds to a step S24 and displays a message prompting the purchaser to perform correct operation such as prompting the purchaser to put all the food the purchaser taken out from the food table 1-*i* into the package 200 on the monitor 13, and then returns operation to the step S20.

In a case the weight of the food sold by weight measured by the scale included in the food table 1-*i* and the weight of the food sold by weight measured by the scale included in the tray table 2-*i* do not match when the purchaser takes the food sold by weight from the food table 1-*i*, something unjust may have been done such that the food sold by weight taken out from the food table 1-*i* may have not been put in the package 200 on the specific tray 100, or something other than the package 200 may be placed on the specific tray 100. As a result the message is displayed prompting the purchaser to perform correct operation.

When the control apparatus 10-*i* determines that the weight of the foods sold by weight measured by the scale included in the food table 1-*i* and the weight of the foods sold by weight measured by the scale included in the tray table 2-*i* match according to the determination at the step S23, the process proceeds to a step S25 and the control apparatus 10-*i* obtains information on a unit price of the food sold by weight in the package 200 sold at the food table 1-*i* to which the control apparatus 10-*i* is set, by referencing the foods information table 4.

That is to say, as the control apparatus 10-*i* knows the food number of the foods sold by weight sold at the food table 1-*i*, to which the control apparatus 10-*i* is set, it obtains information on the unit price of the food sold by weight in the package 200 by referencing the foods information table 4 with the food number as a key.

Then at a step S26, the control apparatus 10-*i* calculates the sales price of the food sold by weight in the package 200 based on the weight of the food sold by weight detected at the step S19 and the information on the obtained unit price at the step S25.

That is to say, when the information on the unit price of the food sold by weight in the package 200 is organized as the sales price set for a basic unit g, the sales price of the foods sold by weight in the package is calculated by multiplying the weight of the food sold by weight detected at the step S19 by the information on the unit price.

When the information on the unit price of the food sold by weight in the package 200 is organized as the sales price set for each unit piece, the sales prices of the foods sold by weight in the package 200 is calculated by dividing the weight of the food sold by weight detected at the step S19 by the average weight for a piece, calculating the number of food sold by weight in the package 200 and multiplying the calculated number by the price for a piece. Here, the number of food sold by weight in the package 200 is calculated by referencing information on a threshold indicating a range for the weight of the piece of the food deviated from the average weight.

Then at the step S27, the control apparatus 10-*i* writes the food name of the food sold by weight in the package 200 (previously known), food number of the food sold by weight (previously known), information on the unit price of the food sold by weight obtained from the foods information table 4, information on the quantity or the number of the food sold by weight in the package 200, and information on a calculated sales price of the food sold by weight in association with the numbers in the tray table 2-*i* in the electronic tag 101 attached to the specific tray 100 placed on the tray table 2-*i* by instructing the electronic tag reader/writer 11 to write as such. The control apparatus 10-*i* further writes the total weight of the foods sold by weight before the food is taken (the total weight of the foods after the food is taken at the previous selling space) and the total weight of the foods sold by weight after the food is taken (the sum of the total weight before the food is taken and the weight of the food currently taken) in association with the numbers in the tray table 2-*i*.

When a selling space of the food sold by weight is the first selling space in the example shown in FIG. 7, sales information that 50 g of a food boiled in soy sauce of food number 001 which is worth 150 yen (sold 30 yen per 10 g) is sold is written in association with the number three of the tray table 2-*i* as shown in FIG. 7, and weight information that 0 g of the total weight of the foods sold by weight in the package 200 before the selling becomes 50 g after the selling is written in association with the number three of the tray table 2-*i* as shown in FIG. 8 in the electronic tag 101 attached to the specific tray 100 placed on the tray table 2-*i*, by instructing the electronic tag reader/writer 11 to write as such.

Then at the step S28, the control apparatus 10-*i* displays price information or the like of the sold foods sold by weight on the monitor 13.

Price information such as 50 g of a food boiled in soy sauce whose sales price is 150 yen is in the package 200 is displayed.

Then the purchaser brings the specific tray 100 to the next selling space. In response to this, the tray side control apparatus 20-*i* detects the end of measuring the weight when a state of no weight is detected by the scale included in the tray table 2-*i*, and informs that to the control apparatus 10-*i*.

Then at a step S29, the control apparatus 10-*i* determines whether the end of measuring the weight is informed from the tray side control apparatus 20-*i* or not. When the control apparatus 10-*i* determines that the end of measuring the weight has not been informed from the tray side control apparatus 20-*i*, the control apparatus 10-*i* waits until the end of measuring the weight is informed.

When the control apparatus 10-*i* determines that the end of measuring the weight has been informed from the tray side control apparatus 20-*i* according to the determination of the step S29, the process proceeds to the step S10 to sell the food to the next purchaser.

In such a manner, it is possible to sell the food sold by weight without requiring a shop assistant to assist the purchaser, while preventing an unjust purchase from being done according to the processing of the control apparatus 10-*i* provided for each food table 1-*i*.

That 50 g of a food boiled in soy sauce which is worth 150 yen (sold 30 yen per 10 g) is taken from the number three tray table 2-*i* provided in association with the food table 1-*i* for the food boiled in soy sauce of the food number 001 at first, then, 100 g of sweet potato paste mixed with chestnuts which is worth 300 yen (sold 30 yen per 10 g) is taken from the number five tray table 2-*i* provided in association with the food table 1-*i* for sweet potato paste mixed with chestnuts of the food number 003, and then two fried horse mackerels which are worth 200 yen (sold for 100 yen per piece) are taken from the number eight tray table 2-*i* provided in association with the food table 1-*i* for fried horse mackerels of the food number 004, as shown in FIG. 7, for example, is recorded on the writing area of the electronic tag 101 shown in FIG. 4 according to the process of the control apparatus 10-*i* provided for each food table 1-*i*.

That 50 g of a food sold by weight is in a package 200 after the food is taken when 50 g of the food sold by weight is taken into the package 200, which was empty before the food is taken at the number three tray table 2-*i* at first, then, the total 150 g of foods sold by weight is in the package 200 after the food is taken when 100 g of a food sold by weight is taken into the package 200 containing 50 g of food sold by weight before the food is taken from the number five tray table 2-*i*, and then, the total 355 g of foods sold by weight is in the package 200 after the food is taken when two fried horse mackerels weighing 205 g are taken into the package 200 containing 150 g of foods sold by weight before the food is taken from the number eight tray table 2-*i*, as shown in FIG. 8, for example, is recorded on the writing area of the electronic tag 101 shown in FIG. 5 according to the process of the control apparatus 10-*i* provided for each food table 1-*i*.

When the accounting machine 3 receives a request for accounting foods sold by weight in the package 200 on the specific tray 100, it makes accounts square for the foods sold by weight according to the recorded information recorded in the electronic tag 101 attached to the specific tray 100.

Figure 11:
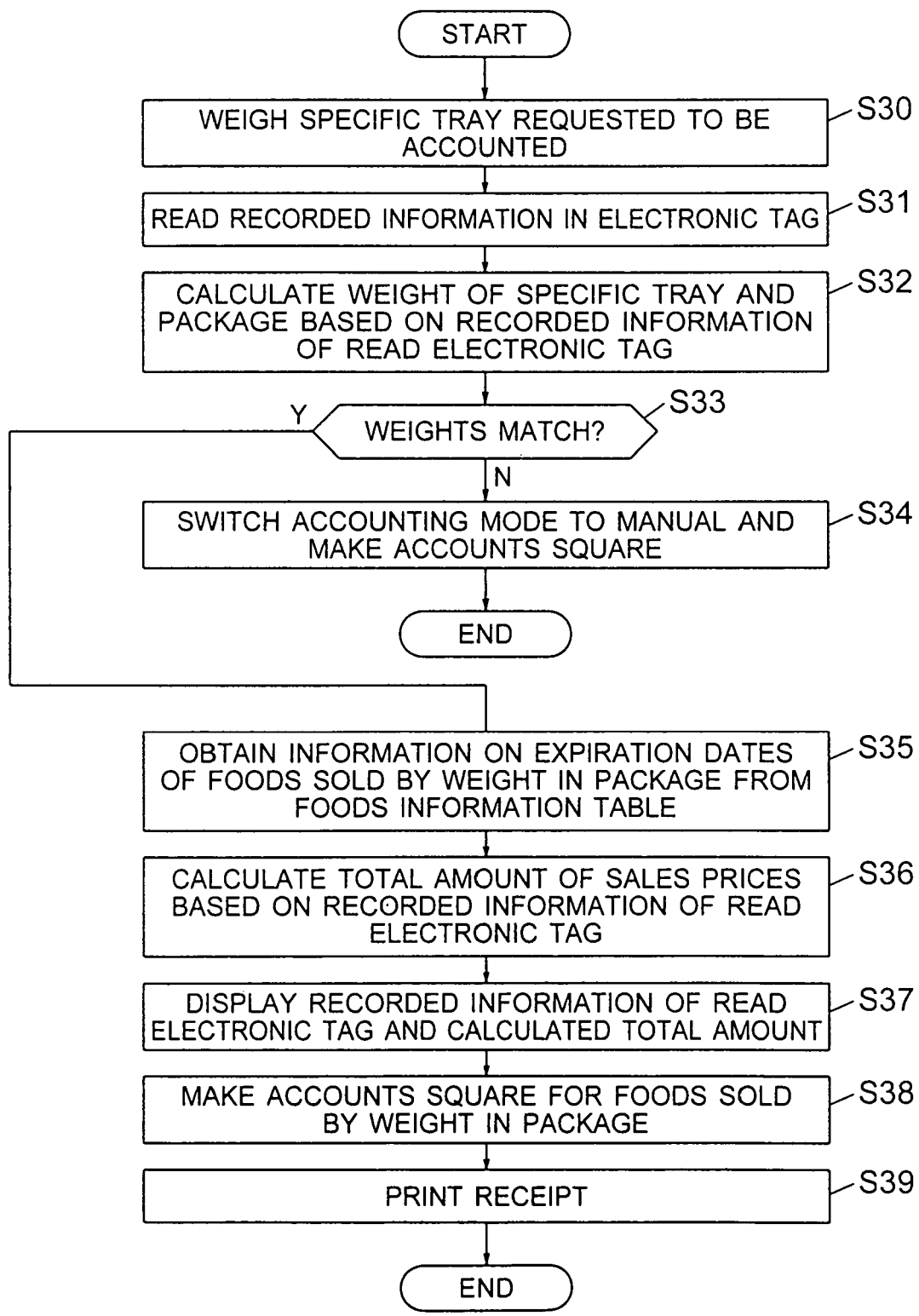
FIG. 11 is a flowchart of a process executed by an accounting machine.

Next, the processing executed by the accounting machine 3 will be described in detail according to the flowchart of FIG. 11.

When the accounting machine 3 receives a request for accounting foods sold by weight in the package 200 on the specific tray 100, it first weighs the specific tray 100 on which the package 200 is placed and which is requested to be accounted by using a scale inside itself at a step S30.

Then at a step S31, the accounting machine 3 reads recorded information in the electronic tag 101 attached to the specific tray 100 which is requested to be accounted is read by instructing the electronic tag reader/writer 30 to read as such.

That is to say, recorded information in the electronic tag 101 that records information as shown in FIGS. 7 and 8 is read.

Then at a step S32, the accounting machine 3 calculates the weight of the specific tray 100 holding the package 200 to be identified by the recorded information of the electronic tag 101 is calculated, by extracting information on the weight of the specific tray 100 and information on the total weight recorded last in the information on the total weight after the selling from the recorded information of the read electronic tag 101 and calculating the sum of the extracted weight of the specific tray 100 and the total weight of the foods sold by weight.

In order to read the electronic tag 101 in which the recorded information exemplified in FIG. 8 is recorded, the weight of the specific tray 100 holding the package 200 to be identified by the recorded information in the electronic tag 101 is calculated by calculating the sum of the weight of the specific tray 100 of 200 g and the total weight of the foods sold by weight in the package 200 of 355 g.

Then at a step S33, the accounting machine 3 determines whether the weight measured at the step S30 and the weight calculated at the step S32 match or not.

When the accounting machine 3 determines that the actually measured weight and the weight identified by the recorded information in the electronic tag 101 do not match according to the determination at the step S33, the process proceeds to a step S34 and the accounting machine 3 makes accounts square for the foods sold by weight in the package 200 by switching the accounting mode to manual and finishes the processing.

When the accounting machine 3 determines that the actually measured weight and the weight identified by the recorded information in the electronic tag 101 match according to the determination at the step S33, the process proceeds to a step S35 and obtains information on the expiration dates of the foods sold by weight in the package 200 from the foods information table 4.

That is to say, as the recorded information read from the electronic tag 101 at the step S31 records the food numbers of the foods sold by weight in the package 200 as shown in FIG. 7, information on the expiration dates of the foods sold by weight in the package 200 is obtained by referencing the foods information table 4 with the food number as a key.

Then at a step S36, the accounting machine 3 calculates the total amount of the sales prices recorded in the recorded information read from the electronic tag 101 at the step S31.

That is to say, as the recorded information read from the electronic tag 101 at the step S31 records information on sales prices of the foods sold by weight in the package 200 as shown in FIG. 7, the total amount of the sales prices is calculated.

Then at the step S37, the accounting machine 3 extracts information that is required to be presented to the purchaser from the recorded information read from the electronic tag 101 at the step S31, and displays the extracted information and the information on the total amount of the sales prices calculated at the step S36.

For example, as shown in FIG. 12, there are displayed what kinds of foods sold by weight are in the package 200, values of the quantity or the number of the foods, the sales prices, and the total amount of the sales prices.

Then at the step S38, the accounting machine 3 makes accounts square for the foods sold by weight in the package 200 based on the total amount calculated at the step S36.

Then at the step S39, the accounting machine 3 prints a receipt with description of information on the expiration dates obtained at the step S35 and finishes the processing.

In such a manner, it is possible to make accounts square for the foods sold by weight in the package 200 without needing a weight of each food sold by weight at the accounting place, while preventing unjust purchase from being done according to the recorded information in the electronic tag 101 attached to the specific tray 100 which is requested to be accounted, according to the process of the accounting machine 3.

Although the embodiment described above is adapted to have a single food table 1-$i$ and a single tray table 2-$i$ associated with each other, the present invention can be adapted to provide a plurality of tray tables 2-$i$ such as providing two tray tables 2$a$-$i$ and 2$b$-$i$, for example, on a food table 1-$i$ as shown in FIG. 13.

In such a case, the present invention is adapted to provide a specific utensil for each of the tray tables 2$a$-$i$ and 2$b$-$i$ attached with electronic tags as a utensil used for taking the food sold by weight into the package 200. The present invention is adapted to prevent a situation in which the food sold by weight is taken in the package 200 with something other than the specific utensil from occurring by sounding an alarm.

Figure 14:
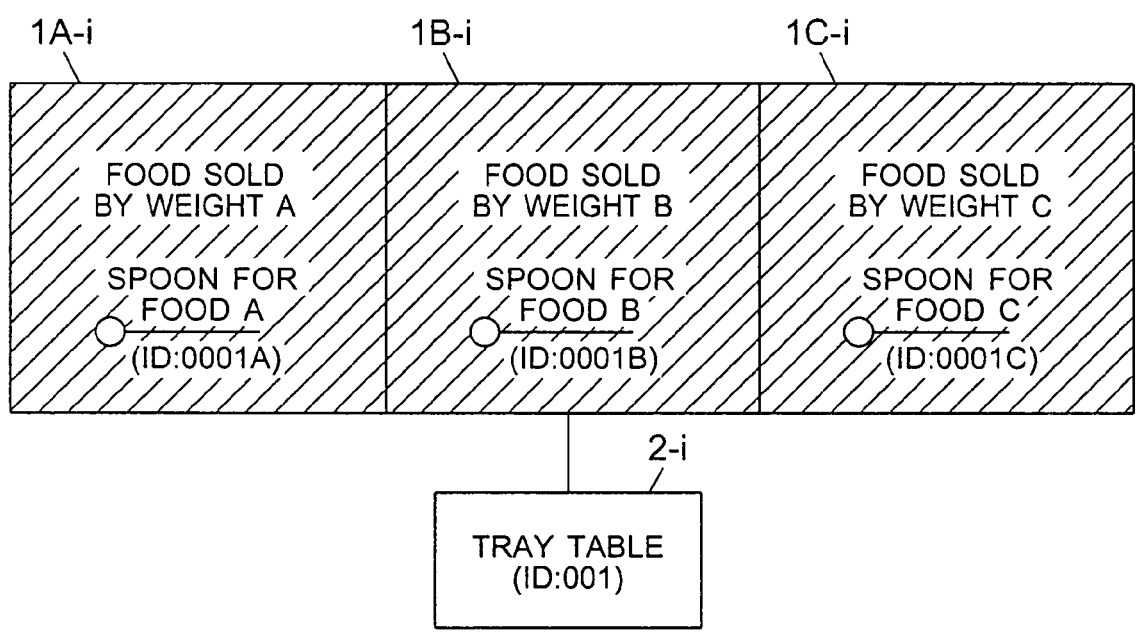

Alternatively, as shown in FIG. 14, the present invention can be adapted to provide a single tray table 2-$i$ in association with a plurality of food tables 1-$i$ such as to provide a single tray table 2-$i$ in association with three food tables 1-$i$, a food table 1A-$i$ for containing a food A sold by weight, a food table 1B-$i$ for containing a food B sold by weight, and a food table 1C-$i$ for containing a food C sold by weight.

In such a case, the present invention is adapted to prepare a specific utensil for each of the food tables 1-$i$ attached with an electronic tag as a utensil used for taking the food sold by weight into the package 200 so that what kind of food sold by weight is taken in the package 200 can be recognized.

Although the present invention is described with reference to the shown embodiment, the present invention is not limited to the embodiment. Although the embodiment is adapted such that the control apparatus 10-$i$ records the total weight after the selling in the electronic tag 101 as shown in FIG. 8, and another control apparatus 10-$i$ that performs another selling reads the total weight for using, the present invention can be adapted such that each control apparatus 10-$i$ records the weight of each food sold by weight as it is in the electronic tag 101 and another control apparatus 10-$i$ that performs another selling reads each weight and calculates the total weight.

Although it is assumed that a purchaser selects a food sold by weight and takes the food into the package 200 in the embodiment, the present invention can be applied to a case where a shop assistant at the shop selects a food sold by weight according to the purchaser's request and takes the food into the package 200.

Although the present invention is described as applied to a food sold by weight in the embodiment as in the specific example, the present invention can be applied to an item sold by weight other than a food sold by weight.

The present invention enables the items sold by weight to be made accounts square without needing each of the items sold by weight is weighed at the accounting place, while checking whether an unjust purchase is done for the items sold by weight.

As a plurality of items sold by weight can be taken in a package, the present invention can effectively make accounts square for the items and reduce usage of the package resource.

What is claimed is:

1. A method for selling an item to be sold by weight executed in a system having a control apparatus set on each item-selling space, an accounting apparatus set on a checkout space and using a tray having a recording unit from which data is read and in which data is written, the method comprising:

a step for a first weight-measuring device included in the control apparatus of measuring a weight of an item displayed for sale in an item-selling space;

a step for the control apparatus of holding the weight measured by the first weight-measuring device,
    detecting whether the measured weight of the displayed item is changed from the weight held prior to the measuring,
    holding the weight difference between the measured weight and the held weight, and
    presenting a notice of measuring a tray;

a step for a second weight-measuring device included in the control apparatus of measuring a weight of a tray on which the item placed within a package is placed when the notice is presented;

a step for the control apparatus of calculating a weight of the item placed within the package on the tray based on predetermined weights of the package and the tray,
    determining whether the weight of the item placed within the package equals the weight difference,
    calculating a sales price of the item placed within the package based on the measured weight of the item placed within the package and a predetermined unit price of the item,
    writing the measured weight and the calculated sales price in the recording unit of the tray holding the package;

a step for a third weight-measuring device included in the accounting apparatus of measuring a weight of the tray holding the package;

a step for the accounting apparatus of calculating a weight of the item placed within the package based on the predetermined weights of the package and the tray,
    reading the weight from the recording unit,
    determining whether the measured weight of the item placed within the package equals the read weight,
    reading the sales price from the recording unit, and
    checking out the item on the tray according to the read sales price.

2. The method according to claim 1, further comprising:
a step for the second weight-measuring device of measuring a weight of the tray including the package which is placed on the tray at a first time when the tray is placed on the second weight-measuring device; and
a step for the control apparatus of writing the measured weight of the tray in the recording unit of the tray holding the package,
wherein, in the step of calculating the weight of the item place within the package, the accounting apparatus calculates a weight of the item placed within the package by reducing the weight of the tray and the package read from the recording unit from the weight of the tray holding the package.

3. The method according to claim 1, wherein, when the item to be sold by weight is countable, the control apparatus stores an average weight per piece of the item, calculates a number of pieces included in the item placed within the package based on the average weight per piece of the item and the calculated weight of the item placed within the package on the tray, and calculates a sales price of the item placed within the package based on the calculated number of pieces of the item.

4. A method for selling an item to be sold by weight executed in a system having a control apparatus set on each item-selling space, an accounting apparatus set on a checkout space and using a tray having a recording unit from which data is read and in which data is written, the method comprising:
- a step for a first weight-measuring device included in the control apparatus of measuring a weight of an item displayed for sale in an item-selling space;
- a step for the control apparatus of holding the weight measured by the first weight-measuring device,
  - detecting whether the measured weight of the displayed item is changed from the weight held prior to the measuring,
  - holding the weight difference between the measured weight and the held weight, and
  - presenting a notice of measuring a tray;
- a step for a second weight-measuring device included in the control apparatus of measuring a weight of a tray on which the item placed within a package is placed when the notice is presented;
- a step for the control apparatus of calculating a weight of the item placed within the package on the tray based on predetermined weights of the package and the tray,
  - determining whether the weight of the item placed within the package equals the weight difference,
  - writing the measured weight in the recording unit of the tray holding the package;
- a step for a third weight-measuring device included in the accounting apparatus of measuring a weight of the tray holding the package;
- a step for the accounting apparatus of calculating a weight of the item placed within the package based on the predetermined weights of the package and the tray,
  - reading the weight from the recording unit,
  - determining whether the measured weight of the item placed within the package equals the read weight,
  - calculating a sales price of the item placed within the package based on the read weight of the item placed within the package and a predetermined unit price of the item, and
  - checking out the item on the tray according to the read sales price.

5. The method according to claim 4, further comprising:
- a step for the second weight-measuring device of measuring a weight of the tray including the package which is placed on the tray at a first time when the tray is placed on the second weight-measuring device; and
- a step for the control apparatus of writing the measured weight of the tray in the recording unit of the tray holding the package, wherein, in the step of calculating the weight of the item placed within the package, the accounting apparatus calculates a weight of the item placed within the package by reducing the weight of the tray and the package read from the recording unit from the weight of the tray holding the package.

6. The method according to claim 4, wherein, when the item to be sold by weight is countable, the accounting apparatus stores an average weight per piece of the item, calculates a number of pieces included in the item placed within the package based on the average weight per piece of the item and the weight of the item placed within the package read from the recording unit, and calculates a sales price of the item placed within the package based on the calculated number of pieces of the item.

* * * * *